United States Patent [19]

Moody

[11] 4,260,578
[45] Apr. 7, 1981

[54] METHOD AND APPARATUS FOR MAKING ELASTOMER SHEET MATERIAL

[75] Inventor: Dale R. Moody, Dana Point, Calif.

[73] Assignee: AMF Incorporated, White Plains, N.Y.

[21] Appl. No.: 86,373

[22] Filed: Oct. 18, 1979

[51] Int. Cl.³ .............................................. B29C 15/00
[52] U.S. Cl. ................... 264/40.7; 264/146; 264/175; 264/210.2; 425/135; 425/172; 425/297; 425/325; 425/367; 425/380; 425/DIG. 235
[58] Field of Search ............ 264/40.7, 40.1, 146, 264/210.2, 175; 425/367, 363, 325, 135, 172, 297, 380, DIG. 235

[56] References Cited

U.S. PATENT DOCUMENTS

| | | | |
|---|---|---|---|
| 1,248,962 | 12/1917 | Webber | 425/172 |
| 1,435,659 | 11/1922 | Roberts | 264/146 |
| 1,552,559 | 9/1925 | Hammond et al. | 425/172 |
| 1,845,249 | 2/1932 | Derby | 264/146 |
| 2,151,476 | 3/1939 | Kimble et al. | 264/146 |
| 2,550,225 | 4/1951 | Colombo | 264/146 |
| 2,669,948 | 2/1954 | Naylor | 425/367 |
| 3,115,672 | 12/1963 | Seanor | 425/367 |
| 3,936,258 | 2/1976 | Lake | 425/367 |
| 4,117,054 | 9/1978 | Salo | 425/367 |

Primary Examiner—Jeffery R. Thurlow
Attorney, Agent, or Firm—George W. Price; Charles J. Worth

[57] ABSTRACT

A novel method and apparatus for making elastomer sheet utilizing a novel extruder in combination with novel calendering apparatus.

14 Claims, 8 Drawing Figures

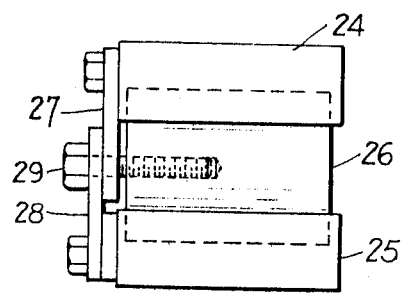
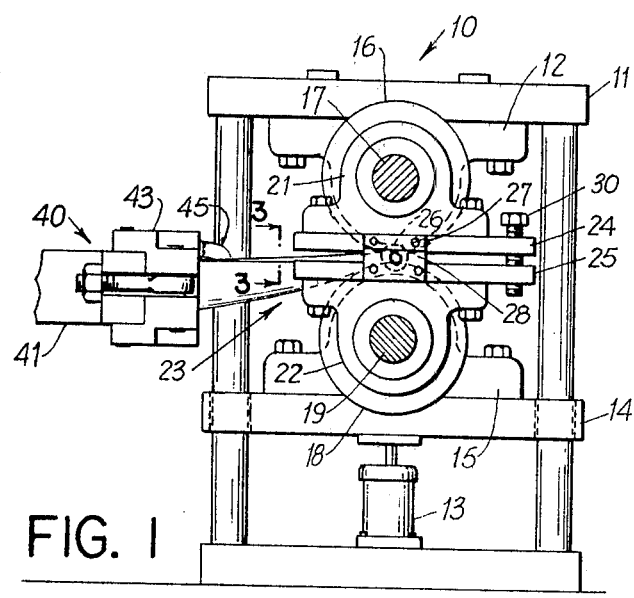
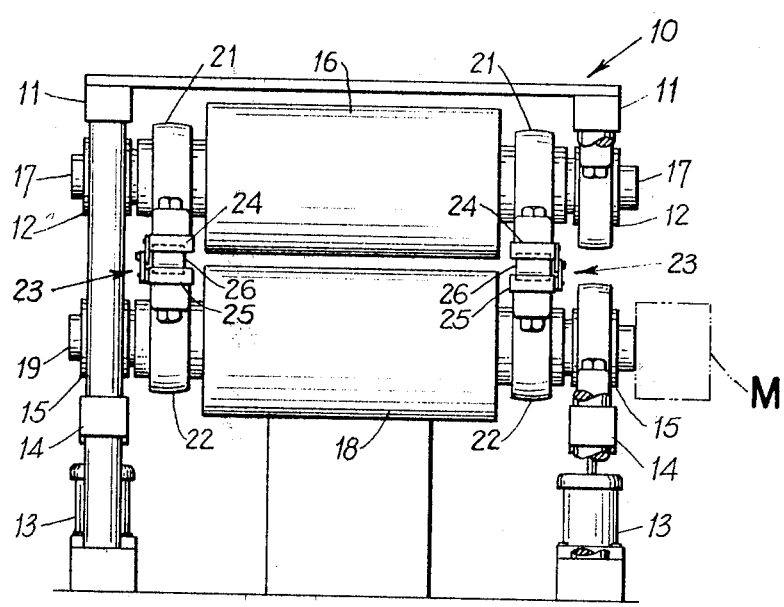

METHOD AND APPARATUS FOR MAKING ELASTOMER SHEET MATERIAL

This invention relates to a method, and the apparatus therefore, for making elastomer sheet material in which the width and thickness thereof are held within relatively precise limits.

Because of production difficulties, extrusion of elastomeric sheet has found very limited commercial aceptance and usually only when maintaining close tolerances is not required. Roll forming sheets of elastomeric material also has found only limited use and is quite costly because of the multiple staging of rollers and the need of rollers with particular profiles.

Accordingly, an object of the present invention is to provide an improved method, including both extrusion and roll forming or calendering, for making elastomeric sheet while maintaining the width and thickness of the sheet within relatively precise limits.

Another object of the present invention is to provide the foregoing method for producing such sheet without surface irregularities normally encountered when extruding elastomeric sheet material.

Another object of the present invention is to provide the foregoing method with means for correcting the thickness of the sheet without interruption of production.

And another object of the present invention is to provide an improved extruder nozzle and plug arrangement.

And still another object of the present invention is to provide an improved roller or calender arrangement having preloaded rollers maintained by constant force means in which the nip or space between the rollers can be adjusted during the rolling or calendering operation.

The foregoing and other objects and advantages will appear more fully hereinafter from a consideration of the detailed description which follows, taken together with the accompanying drawings wherein several embodiments of the invention are illustrated by way of example. It is to be expressly understood, however, that the drawings are for illustration purposes only and are not to be construed as defining the limits of the invention.

FIG. 1 is a side elevational view, partially in section, of the novel apparatus operating in a manner to teach the novel method in accordance with the present invention.

FIG. 2 is a front elevational view of the calendering apparatus of FIG. 1.

FIG. 3 is an enlarged fragmentary view taken on line 3—3 of FIG. 1.

Figure 5:
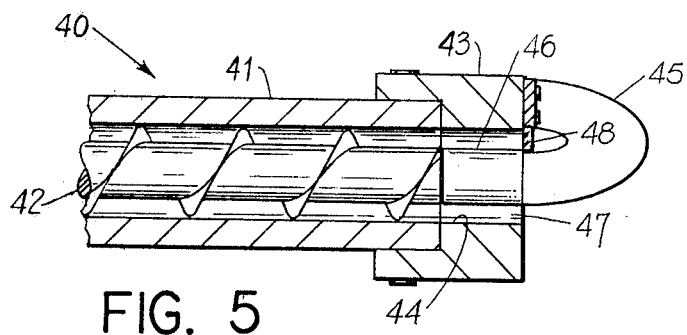
FIG. 5 is an enlarged sectional view of the discharge end of the extruder of FIG. 1.

Referring now to the drawings and particularly FIG. 1, an extruder 40 (see also FIGS. 5 and 6) is provided with a feed screw 42 rotating in a barrel 41 for providing a tubular elastomeric extrusion E through its head 40, as will be further discussed. As the tubular extrusion E discharges from the head 40 it is slit by a blade 48 and then opened to a planar configuration and fed to the nip between rollers 16 and 18 of the roll forming or calendar apparatus 10. To prevent the unsupported material from sagging and to obtain the necessary flair for changing from a tubular to a planar configuration, the extruder head 43 should be located relatively close to the rollers 16 and 17 while the nip between the rollers must be above the central axis and preferably at the top of the discharging extrudate.

The roller 16 which is fixed in position has the ends of its shaft 17 journalled in pillow blocks 12 mounted at the upper end of the frame 11 of the calendar apparatus 10. The roller 18 is in vertical alignment with the roller 16 and has the ends of its shaft 19 journalled in pillow blocks 15 which are mounted on elevator or slide members 14 movable vertically on the frame 11. Constant pressure fluid motors 13 are provided to move elevator members 14 and roller 18 toward and away from the roller 16.

A bearing block 21, similar to the pillow blocks 12 and 15, is mounted on each end of the shaft 17 while a similar bearing block 22 is mounted on each end of the shaft 19. Disposed between the bearing blocks 21 and 22 on each side of the rollers 16 and 18 is a load and nip adjusting assembly 23 comprising upper and lower plates 24 and 25 connected to bearing blocks 21 and 22, respectively, and a load bearing 26 positioned between and in transverse-recesses in the plates 24 and 25.

Figure 4:
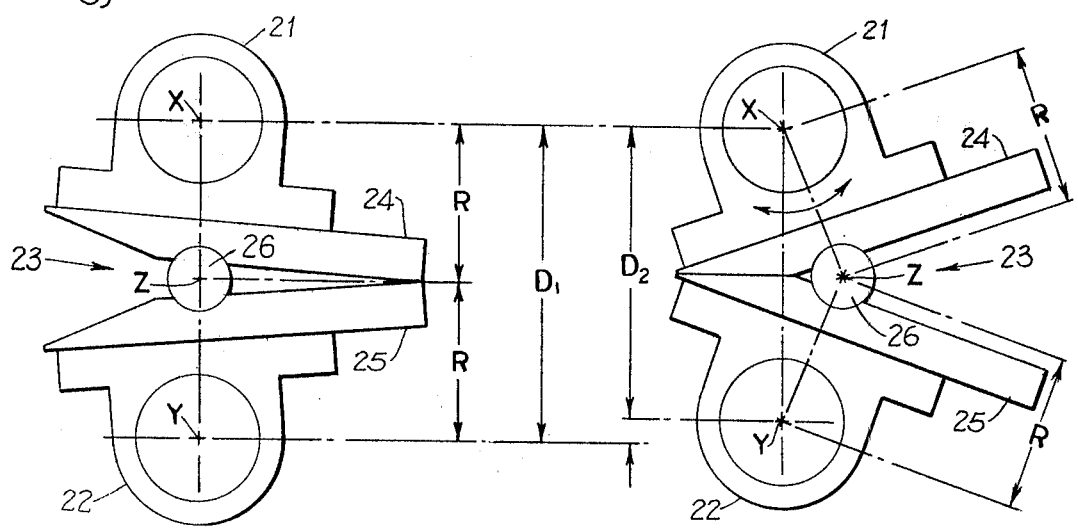
FIG. 4 is a diagrammatic illustration to teach the geometry of the precise nip adjustment means in accordance the the present invention.

Plates 24 and 25 are provided at one end with a nip adjusting means 30 and, as best shown in FIG. 3, a hinge means comprising a pair of overlapping plates 27 and 28 mounted on the respective plates 24 and 25, and joined together and to the load bearing 26 by a pin or fastener 29 which defines the hinge axis Z (see FIG. 4). The nip adjusting means 30 (see FIG. 1) is diagrammatically shown as a threaded member which can be manually adjusted or may be power driven (not shown). One of the rollers 16 or 18 is provided with drive or motor means M diagrammatically shown in FIG. 2 as driving roller 18.

When ready for operation, motors 13 have elevated roller 18 until the assemblies 23 are clamped tightly between bearing blocks 21 and 22 and delimit the nip opening between rollers 16 and 18. The force of the constant pressure motors 13 load the pillow blocks 12 and 15, the bearing blocks 21 and 22 and the load bearings 26. Bearing blocks 22 and plates 25 are preferably connected together while bearing blocks 21 and plates 24 are provided with pins permitting them to be separated for interposing shims therebetween for large nip adjustments.

For relatively small precise nip adjustments, plate members 24 and 25 are pivoted relative to one another on the load bearing 26. The load and nip adjustment assembly 23 and the bearing blocks 21 and 22 are diagrammatically shown in FIG. 4 in the maximum and minimum nip opening positions. In the maximum nip opening position at the left portion of the drawings, a vertical axis extends through the axes X of roller 16, Y of roller 18 and Z of load bearing 26. In the absence of shims, the distances X-Z and Y-Z each equal R and the distance X-Y equals $D_1$. In the minimum nip position at the right side of FIG. 4, the axis X remains stationary while the axis Z is rotated on the radius R around axis X causing the axis Y to move upwardly because of slide members 14 so that the distance X-Y is now equal to $D_2$, and the total nip adjustment available by use of the assembly 23 is equal to $D_1$ minus $D_2$. By setting up the apparatus 10 with the assembly 23 in a position intermediate the minimum and maximum position as shown in FIG. 4, the assembly 23 will provide or make available increasing and decreasing nip opening adjustments. Because of the rotational movement of plates 24 and 25 around the axes X,Y, and Z, the assembly 23 can by adjusted while the apparatus 10 is under load due to the force of motors 13 and during operation.

In normal roll forming elastomeric sheets, the material is fed through successive sets of rollers which progressively reduce the thickness and expand the width of the material until it ultimately is formed within the predetermined units. The adjustable rollers of such equipment are usually positioned by screw jack type motors which are not constant pressure or constant force devices, and tend to bind under load and cannot, therefore, provide minor adjustments of the nip during operation. Further, none of the roll forming apparatus up to this time had provisions for loading the bearing of the rollers prior to operation of the equipment.

In accordance with the present invention the extruder 40 or 50 provides a tubular extrudate with an annular wall substantially equal to the width or lateral measurement of the sheet being made. The calender or roll forming apparatus 10 primarily controls the thickness of the sheet and can be suitably controlled to make small lateral adjustments either increasing or decreasing sheet width to within relatively precise limits.

Figure 6:
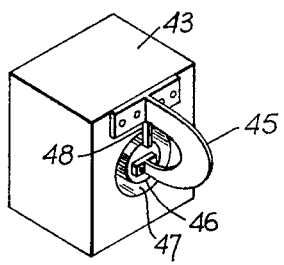
FIG. 6 is a perspective view of the extruder head and plug arrangement of FIG. 5.

Referring now to FIGS. 5 and 6, the extruder 40 has a tube 41 and a feed screw 42, for the extrudate, rotatable within the tube. A head 43 is mounted on the discharge end of the tube 41 in any suitable manner as shown in FIG. 1 and has an inner circular wall 44. A plug member 45 is mounted on the head 44 and has a portion which extends toward the screw 42 providing a wall 46 which is substantially coextensive with the wall 44. The walls 44 and 46 are concentric about a common axis which is the axis of rotation of the screw 42, and are spaced from one another to form a constant annular discharge passage 47 for tubular extrudate. A blade 48 is mounted on the head 43 and extends across the top of the annular passage 47 to longitudinally slit the tubular extrudate as it discharges from the extruder 40. The slit of the tubular extrudate is immediately opened so that the extrudate does not contact the support portion of the plug 45 and is of planar form when fed to the nip between the rollers 16 and 18.

Figure 7:
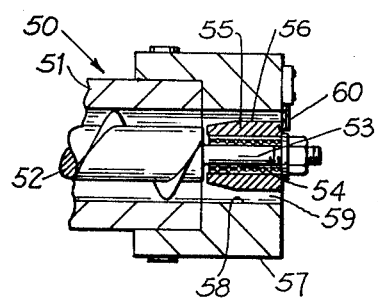
FIG. 7 is a view similar to FIG. 5 of a modified extruder head and plug arrangement.
Figure 8:
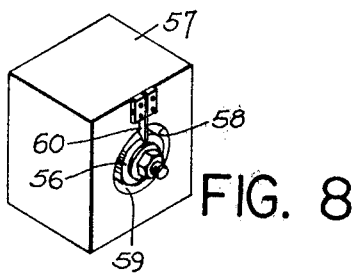
FIG. 8 is a view similar to FIG. 6 of the head and plug arrangement of FIG. 7.

Referring now to FIGS. 7 and 8, a modified extruder 50 is provided with a tube 51 and a feed screw 52 corresponding to the tube 41 and screw 42 of extruder 40. The feed screw 52 has a reduced end portion 53 which extends through a circular inner wall 58 of a head 57, corresponding to wall 44 of head 40, suitably mounted on the discharge end of the tube 51. A tubular plug member 55 is mounted on the reduced end 53 of the screw 52 by antifriction means such as ball bearings 54, and has a wall 56 corresponding to wall 46 of plug 45. The walls 56 and 58 are concentric and spaced from one another to define a constant annular disharge passage 59 corresponding to discharge passage 47 of extruder 40. A blade 60 which extends across the top of the passage 59 is connected at its opposite ends to the head 57 and plug 55 to prevent the plug from rotating with the feed screw 52 and to longitudinally slit the tubular extrudate discharging from the extruder 50.

Although not shown, the calender or roll forming apparatus 10 preferably is provided with any suitable edge sensing means, well known in the art, which is connected to a speed control means for the motor M. When the sensing means determines that the width of the sheet is becoming excessive, a signal is provided to the motor means M to increase the speed of roller 18 to create a drawing action between the extruder 40 and 50 and the calender or roll former apparatus 10. Of course, when the width of the sheet becomes smaller than desired, the sensing means will provide signals to the motor means M to decrease the speed of roller 18.

Although several embodiments of the invention have been illustrated and described in detail, it is to be expressly understood that the invention is not limited thereto. Various changes may be made in the design and arrangement of the parts without departing the spirit and scope of the invention as the same will now be understood by those skilled in the art.

What is claimed is:

1. A method of making elastomer sheet comprising the steps of
   providing an extruder and extruding elastomer material in tubular form;
   longitudinally slitting the tubular elastomer material as it discharges from the extruder;
   opening the slit tubular elastomer material to a planar form;
   providing calendering means having a pair of spaced rollers with bearing means and means providing a constant force for holding one of the rollers in position relative to the other;
   providing nip adjusting means between the bearing means to delimit the nip between the rollers and to load the bearing means by the constant force;
   introducing the planar elastomer material to the nip between the pair of rollers; and
   calendering the planar elastomer material with said pair of rollers thereby reducing said material to a desired thickness.

2. The method in accordance with claim 1, and providing the tubular elastomer material with an annular wall substantially equal to the width of the elastomer material after calendering.

3. The method in accordance with claim 2, and drawing the material being introduced to the nip between the rollers to control the width of the material after calendering.

4. The method in accordance with claim 3, and measuring the thickness of the calendered sheet; and adjusting the nip between the rollers during calendering as required to maintain the thickness of the calendered sheet constant.

5. Apparatus for making elastomer sheet, comprising extruding means for providing at its discharge a tubular extrudate of elastomer material;
   means at the discharge of said extruding means for longitudinally slitting the tubular extrudate as it is discharged from said extruding means;
   calendering apparatus having a frame;
   first roller means being rotatable and mounted in a fixed position on said frame;
   second roller means being rotatable and mounted on said frame for movement toward and away from said first roller means;
   said roller means including bearing means;
   fluid motor means for moving said second roller means toward and away from said first roller means, and providing a constant force for holding said second roller means in its operating position;

means disposed between said first and second roller means being clamped between said bearing means to limit the movement of said second roller means toward said first roller means thereby delimiting the nip between said roller means and causing said roller means to be loaded by the constant force of said motor means;

said calendering apparatus being spaced horizontally from the discharge end of said extruding means with the nip between said roller means being at least as high in elevation as the center of said extruding means.

6. The apparatus in accordance with claim 5, and said means clamped between said bearing means being adjustable when said roller means are loaded for changing the nip between said roller means.

7. The apparatus in accordance with claim 6, and variable speed motor means connected to and rotatable driving at least one of said roller means.

8. The apparatus in accordance with claim 6, and said extruding means comprising a tubular member;

a feed screw rotatable in said tubular member;

a head mounted on the end of said tubular member and having an inner wall;

a plug connected to said head and at least in part disposed within said inner wall;

said plug within said head having an outer wall concentric with and spaced from said inner wall thereby defining therebetween an annular opening for discharging elastomer extrudate in tubular form; and a blade connected to said head extending across said annular discharge to said plug longitudinally slitting the tubular extrudate as it leaves through said annular discharge.

9. The apparatus in accordance with claim 8, and said plug having a support portion extending across said discharge being connected to said head;

said support portion being spaced from said discharged; and said blade being disposed between said discharge and said support portion.

10. The apparatus in accordance with claim 8, and said feed screw have a reduced end portion;

said plug being a sleeve mounted on said end portion; and said blade being connected at its ends to said head and said sleeve.

11. Calender apparatus for elastomer material, comprising a frame having vertically movable means;

a first roller with shaft means extending from the ends of said roller rotatable mounted on said frame;

another roller with shaft means extending from the end of said roller rotatable mounted on said vertically movable means;

fluid motor means for moving said vertically movable means thereby moving said other roller toward and away from said first roller;

bearing means mounted on both ends of the shafts of both rollers;

load means connected to the bearing means on both ends of one of said shafts and being clamped between the bearing means on opposite shafts thereby limiting the movement of said other roller toward said first roller and delimiting the nip between said rollers;

variable speed motor means connected to rotatable drive one of said rollers; and said fluid motor means providing a constant force for loading both of said rollers when said load means are clamped between said bearing means.

12. The calender apparatus in accordance with claim 11, and each of said load means being adjustable when said rollers are loaded for changing the nip between said rollers.

13. The calender apparatus in accordance with claim 12, and each of said load means comprising a pair of plates disposed in spaced face to face relationship;

a bearing member disposed between said plates and spaced from the opposite ends thereof;

a hinge having two members each connected to a different one of said plates;

said two members being pivotally connected together and to said bearing member; and means at a common end of said plates to vary the angular position of one plate to the other thereby adjusting said load means for varying said nip.

14. The calender apparatus in accordance with claim 13, and each of said plates having a transverse recess in spaced face alignment with the recess of said other plate providing a seat for said bearing member.

* * * * *